US 9,827,598 B2

(12) United States Patent
Robbins

(10) Patent No.: US 9,827,598 B2
(45) Date of Patent: Nov. 28, 2017

(54) SYSTEM AND METHOD FOR SORTING ITEMS

(75) Inventor: Ronald Robbins, Lafayette, IN (US)

(73) Assignee: Engineering Innovation, Inc., Lafayette, IN (US)

( * ) Notice: Subject to any disclaimer, the term of this patent is extended or adjusted under 35 U.S.C. 154(b) by 1145 days.

(21) Appl. No.: 12/949,342

(22) Filed: Nov. 18, 2010

(65) Prior Publication Data

US 2011/0066572 A1    Mar. 17, 2011

Related U.S. Application Data

(62) Division of application No. 12/044,617, filed on Mar. 7, 2008.

(51) Int. Cl.
*B07C 3/00* (2006.01)
*B07C 7/00* (2006.01)
*B07C 5/00* (2006.01)
*G06Q 10/08* (2012.01)

(52) U.S. Cl.
CPC ............. *B07C 3/00* (2013.01); *B07C 5/00* (2013.01); *G06Q 10/08* (2013.01); *B07C 7/00* (2013.01)

(58) Field of Classification Search
CPC .............. B07C 3/00; B07C 5/00; B07C 7/00
USPC ................ 705/402, 330, 332; 209/584
See application file for complete search history.

(56) References Cited

U.S. PATENT DOCUMENTS

| 5,287,271 A | * | 2/1994 | Rosenbaum | B07C 3/00 700/224 |
| 5,297,271 A | | 3/1994 | Bhayani | |
| 5,328,169 A | | 7/1994 | Mandel | |
| 5,419,440 A | * | 5/1995 | Picoult | B07C 1/00 209/583 |

(Continued)

OTHER PUBLICATIONS

Non-Final Office Action received in U.S. Appl. No. 12/044,617 dated Dec. 1, 2009.

(Continued)

*Primary Examiner* — Shannon Campbell
*Assistant Examiner* — Omar Zeroual
(74) *Attorney, Agent, or Firm* — Woodard, Emhardt, Moriarty, McNett & Henry LLP

(57) ABSTRACT

Disclosed is a system and method of dynamically sorting items for delivery to diverse destinations in which at least one target location changes during the sorting process using an electronic array that correlates diverse destinations to target locations for sorting, wherein the electronic array changes based upon criteria relating to the results of the sort resulting in the removal of a first set of items from one target location while leaving a second set in the target location and placing the first set in another target location to adapt to the changed array and thereafter continuing to sort further items according to the changed array while some items remain in their initial target locations. Additionally disclosed is a system and method of sorting which electronically identifies items destined for the same address that are comingled with items to diverse destinations, and allows for their separation and bundling responsive to the electronic identification and allows for payment for delivery charges based upon a bundle rather than the individual items included in the bundle.

20 Claims, 6 Drawing Sheets

(56) References Cited

U.S. PATENT DOCUMENTS

| | | | |
|---|---|---|---|
| 5,794,789 A * | 8/1998 | Payson | B07C 3/00 209/549 |
| 5,901,855 A * | 5/1999 | Uno | B07C 3/02 209/584 |
| 5,913,015 A | 6/1999 | Watanabe et al. | |
| 6,107,589 A * | 8/2000 | Yamashita | B07C 3/02 209/583 |
| 6,279,750 B1 | 8/2001 | Lohmann | B07C 3/02 209/547 |
| 6,283,304 B1 * | 9/2001 | Gottlieb | B07C 3/00 209/603 |
| 6,316,741 B1 | 11/2001 | Fitzgibbons et al. | |
| 6,501,041 B1 | 12/2002 | Burns et al. | |
| 6,555,776 B2 | 4/2003 | Roth et al. | |
| 6,881,916 B2 * | 4/2005 | McLaughlin | B07C 3/00 198/349 |
| 6,892,890 B2 | 5/2005 | Dominguez | |
| 7,012,211 B2 | 3/2006 | Brinkley et al. | |
| 7,060,926 B2 * | 6/2006 | Edmonds | B07C 3/00 209/584 |
| 7,060,928 B2 * | 6/2006 | Jirsa | 209/584 |
| 7,387,251 B2 | 6/2008 | Baker et al. | |
| 8,160,972 B1 * | 4/2012 | Tannenbaum | G06Q 10/0835 705/336 |
| 2002/0029202 A1 | 3/2002 | Lopez | |
| 2002/0104782 A1 | 8/2002 | DeWitt et al. | |
| 2002/0120668 A1 * | 8/2002 | Pintsov | G06Q 20/401 709/200 |
| 2004/0059462 A1 | 3/2004 | Norris et al. | |
| 2004/0251180 A1 * | 12/2004 | McDonald | B07C 3/00 209/584 |
| 2005/0025340 A1 | 2/2005 | Hickman | |
| 2006/0070929 A1 * | 4/2006 | Fry | B07C 3/00 209/583 |
| 2006/0108266 A1 * | 5/2006 | Bowers | B07C 3/00 209/584 |
| 2006/0113223 A1 * | 6/2006 | Quine | B07C 3/00 209/584 |
| 2006/0167877 A1 * | 7/2006 | Lee | G06Q 10/00 |
| 2007/0017855 A1 * | 1/2007 | Pippin | B07C 3/00 209/584 |
| 2007/0084764 A1 | 4/2007 | Benninger | |
| 2007/0144948 A1 | 6/2007 | Worth et al. | |
| 2008/0000817 A1 * | 1/2008 | Kostyniuk | B07C 3/00 209/584 |
| 2008/0264836 A1 * | 10/2008 | Girnus | B07C 3/001 209/584 |
| 2009/0159508 A1 * | 6/2009 | Kostyniuk | B07C 3/00 209/584 |
| 2009/0223877 A1 * | 9/2009 | Karnin | B07C 3/00 209/584 |
| 2010/0169242 A1 * | 7/2010 | Salazar | G07B 17/00467 705/408 |
| 2012/0303542 A1 * | 11/2012 | Marcus | G06Q 10/08 705/330 |
| 2013/0124255 A1 * | 5/2013 | Patterson | G06Q 10/04 705/7.27 |
| 2014/0278602 A1 * | 9/2014 | Lievens | G06Q 10/02 705/5 |

OTHER PUBLICATIONS

Final Office Action received in U.S. Appl. No. 12/044,617 dated Jun. 24, 2010.
Advisory Action Before the Filing of an Appeal Brief received in U.S. Appl. No. 12/044,617 dated Sep. 10, 2010.

* cited by examiner

SYSTEM AND METHOD FOR SORTING ITEMS

This application is a divisional of U.S. patent application Ser. No. 12/044,617 filed Mar. 7, 2008, which is hereby incorporated by reference.

BACKGROUND

The present disclosure is related to a system and method for sorting items.

Sorting of items is required when some grouping of previously ungrouped items is desired. Simple sorting systems designate a sort destination for each desired grouping and the items are sorted to the sort destinations in a single pass. The sorting becomes more complicated for various reasons, including when there are more desired groupings than available sort destinations or the desired groupings are not defined until the identity of all the items have been determined. For example, some sorting schemes have a sort hierarchy where a particular sort destination may include several subsidiary or child sort destinations that are only activated if certain criteria, such as number of items, is met. In some instances, all sort destinations may be unknown until the desired destination of each item is identified.

Automated sorting systems exist to sort items as well. For example, automated systems exist to sort mail. These automated mail sorting systems generally have a limited number of sort destinations or the cost of adding additional sort destinations may be prohibitive in terms of capital expense and space or other requirements. Some automated mail sorting systems handle these described difficulties by using multiple sorting passes. For example, an initial sort can be performed where the destination zip code of each piece of mail is determined and a set of different destinations is schemed. Such an initial sort may also "knock out" some percentage of items where their destination was predefined in the first sort, for example, local zip codes. However, additional sorts (and additional passes through the automated sorting system) may be required to sort all of the items according to the set of destinations defined in the initial sort. Such additional passes can burden the overall handling process and significantly reduce the throughput of an automated mail sorting system.

Other sorting schemes are also known to exist. For example, Pitney Bowes in Great Britain used an automated sorting system such as what is described above, however, in addition, the system assessed the amount of mail sent to each bin to determine when a complete group of mail has been achieved based on a parameter such as total thickness, volume or weight. A complete group of mail could be defined by a particular bin being physically full or a mail bag being filled. When the system determines a complete group of mail has been achieved, the system redirects all future pieces of mail from the prior destination bin to a new destination bin (with the same sort destination).

Another sorting scheme is called "QUICK PAK." It assesses each destination bin to determine if a bin has reached a given limit. When the limit is reached, all future pieces of mail directed to the full bin are redirected to an abort pile for future resorting.

The present disclosure is directed toward a system and method that eliminates the above described multiple pass requirement by dynamically adapting an array of item destinations as items are processed and then performing a limited resorting of items to conform to the changed array as may be needed.

DETAILED DESCRIPTION OF THE DRAWINGS

Figure 1:
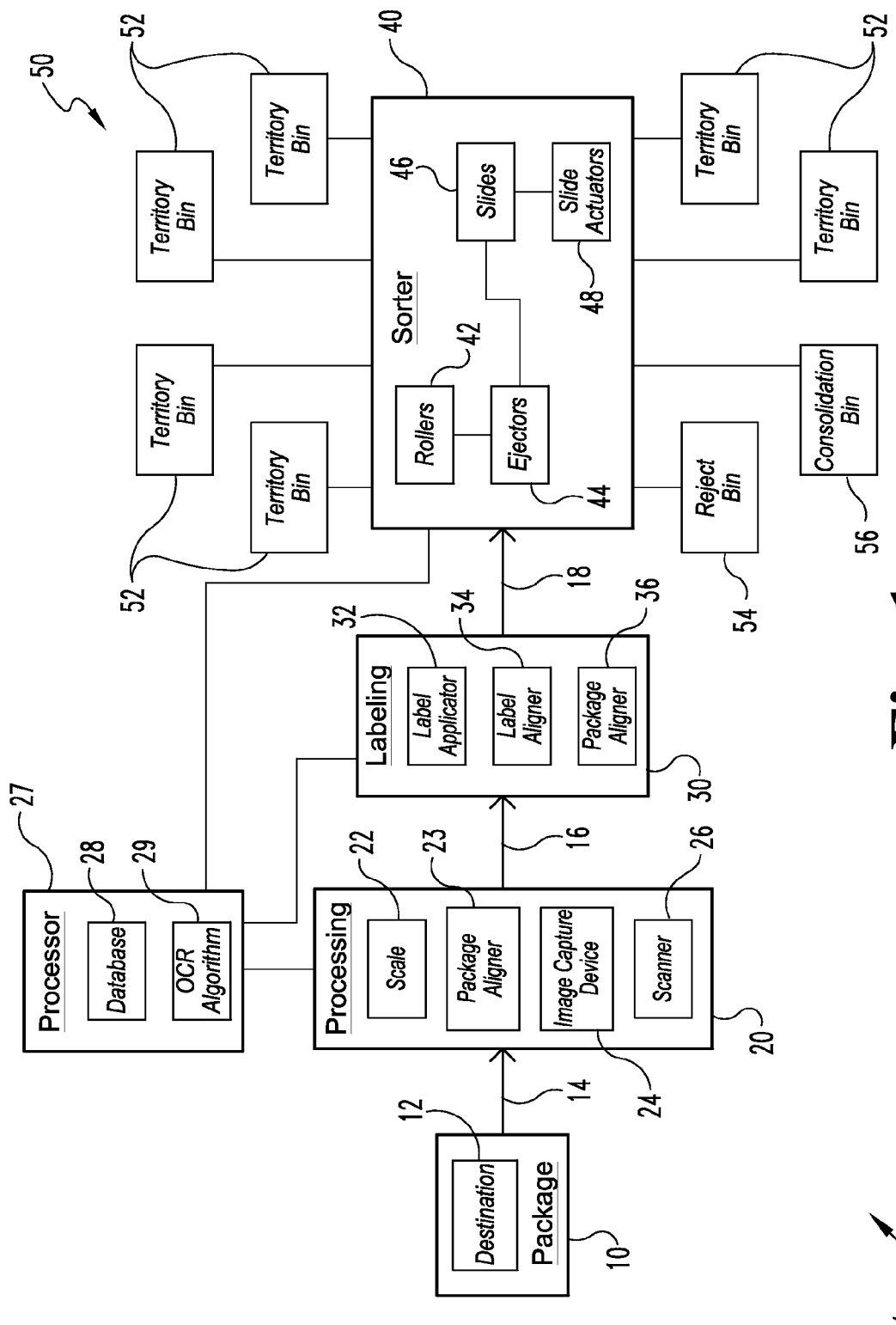
FIG. 1 illustrates an embodiment of a packaged sorting system.

For the purpose of promoting an understanding of the disclosure, reference will now be made to certain embodiments thereof and specific language will be used to describe the same. It will nevertheless be understood that no limitation of the scope of this disclosure is thereby intended, such alterations, further modifications and further applications of the principles described herein being contemplated as would normally occur to one skilled in the art to which the disclosure relates. In several figures, where there are the same or similar elements, those elements are designated with similar reference numerals.

Several embodiments discussed herein disclose an "array" that correlates diverse destinations for items to "target locations." In this sense, "target locations" refer to locations used to sort items and not necessarily the actual destination of the items. Similarly, an "array" may include a multitude of target locations, with many of the target locations being "subsidiary," a "subset" or a "child" of other target locations. For example, sorting may be required for items to be distributed through a network of regional distribution centers, each of the regional distribution centers including a plurality of local distribution centers. This is referred to as a "hierarchy" of target locations. Thus, for a particular item, there may be two or more possible "target locations" to which the item could be sorted. When some criteria, such as number of items to a child target location, is met, then the array is altered to redirect future items to the child target location and some number of items previously sorted to the "parent" target location, as it may be considered, are relocated to the child target location. Such a hierarchy of target locations could include three or more distinct levels. Different levels of target locations in such a hierarchy may be referred to in familiar terms such as parent, grandparent, child, grandchild, great-grandchild, etc. In such embodiments, it would be possible for the array to change multiple times with respect to a particular item or multiple items, with the item or items being relocated in an increasingly subsidiary (or child) target location or locations with each change to the array.

Turning now to FIG. 1 illustrated is package sorting system 1 which comprises one embodiment of a system to sort items. Package sorting system 1 is used to sort a multitude of packages 10. "Package" is used in its broad sense and does not necessarily require a wrapper or other covering. For example, "package" is intended to encompass an unwrapped magazine or postcard. Similarly, "package" can include items that are wrapped or otherwise covered such as boxes, envelopes, parcels, parts or products. Package 10 is illustrated including destination 12. In embodiments in which package 10 is pieces of mail, destination 12 may include the address or portions of the address such as the zip code or the eleven digit Routing Barcode that may be present on U.S. mail. Destination 12 is not limited to including all destination type information that may be present on package 10. For example, an individual's name, while part of the address, may be omitted from destination 12. In some embodiments, destination 12 only includes information necessary to effectuate a sort as described herein. In other embodiments, destination 12 may be included in a list of information correlated to each package but not physically located on each package.

Packages 10 are fed by feed 14 into package processing 20. Feed 14 can include manual feeding by a human operator or automatic feeding utilizing automatic mechanisms as are known in the art. In one embodiment, packages 10 are singulated into package processing 20 by an operator who utilizes a laser light alignment device to align package 10 in processing 20.

In the illustrated embodiment, package processing 20 includes scale 22, package aligner 23, image capture device 24 and scanner 26. Package processing 20 is coupled to a processor 27 including database 28 and optical character recognition algorithm 29 (OCR). In one embodiment, OCR algorithm 29 also includes a Wide Area Bar Code Reader (WABCR). In one embodiment, scale 22 is operable to determine the weight of package 10 and input the weight of package 10 into database 28 as will be described in greater detail herein. In another embodiment, package aligner 23 is one or more laser light line(s) projected onto a portion of scale 22 that provides alignment guidance to an operator who singulates package 10 onto scale 22 for weighing and image capture. In one embodiment, image capture device 24 includes a high-resolution digital camera and a light source. The digital camera being operable to capture a computer readable image of destination information 12 on package 10. Package aligner 23 guides the human operator with positioning information so that when the operator singulates package 10 in package processing 20, destination information 12 is properly aligned with image capture device 24 to increase the probability that the correct information is captured by image capture device 24. Use of package aligner 23 may reduce occurrences of capturing return address information with image capture device 24. In any event, the image generated from image capture device 24 may be processed by OCR algorithm 29 resulting in machine readable destination information stored in database 28.

Package processing 20 may also optionally include scanner 26. Scanner 26 may be operable to read bar codes and/or other readable identifiers that could be located on package 10. For example, as described in detail herein, a unique identifier can be placed on each package during processing through package sorting system 1. Scanner 26 can subsequently read this unique identifier if a particular package needs to be reprocessed for any reason to automatically indicate that the package is being reprocessed rather than being a new package. In other embodiments, scanner 26 can be used to input batch or customer identification information into database 28 so that processed packages are attributed properly.

After processing 20, package 10 passes to labeling 30 via conveyer 16, labeling 30 includes label applicator 32, label aligner 34 and package aligner 36. In one embodiment, as package 10 is conveyed along conveyer 16, package 10 stops at package aligner 36 such that package 10 is accurately positioned with respect to label applicator 32. In one embodiment, label applicator 32 includes a label applying system and a label printing system operable to print onto individual labels. In other embodiments label applicator 32 could print directly on package 10. In the illustrated embodiment, label applicator 32 is attached to label aligner 34 which permits variable positioning of label applicator 32 with respect to package 10 (when package 10 has been aligned by package aligner 36) to permit the placement of a label on package 10 in any desired location.

After labeling 30, package 10 passes to sorter 40 via conveyor 18. Sorter 40 includes rollers 42, ejectors 44, slides 46 and slide actuators 48. Sorter 40 is operable to sort package 10 into a particular sort bin 50. In the illustrated embodiment, sort bins 50 include six territory bins 52, one reject bin 54 and one consolidation bin 56. In this context, "territory" refers to a grouping of destination bins, as described below, not a "destination" territory. Sorter 40 operates by passing package 10 along its length on rollers 42 until package 10 is aligned with the particular bin 50 it is destined for. Slide actuators 48 position the appropriate slides 46 to be in alignment with a sort bin 50 and ejectors 44 operate to push package 10 off rollers 11 sidewise onto slide 46 into the appropriate sort bin 50.

Further regarding FIG. 1, it should be understood that alternative embodiments of each component are contemplated. For example, processing 20 has been described as an automated system. Processing 20, as described above, can be replaced with a human operator manually inputting data into a database. Alternatively, processing 20 can be replaced with a computerized list of weight and destination information associated with unique identifiers that are read with scanner 26.

Similarly with regard to labeling 30, these components could be replaced by an output device such as a CRT that indicates sort destinations to an operator. In yet other embodiments, sorting could be done with automated systems such that the outputted sorting information is machine instructions.

Regarding sorter 40, these components could be replaced by an operator sorting to sort bins 50 as directed by label 200. In other embodiments, sorter 40 could sort directly to destination bins 64 using automated sorting systems.

Figure 2:
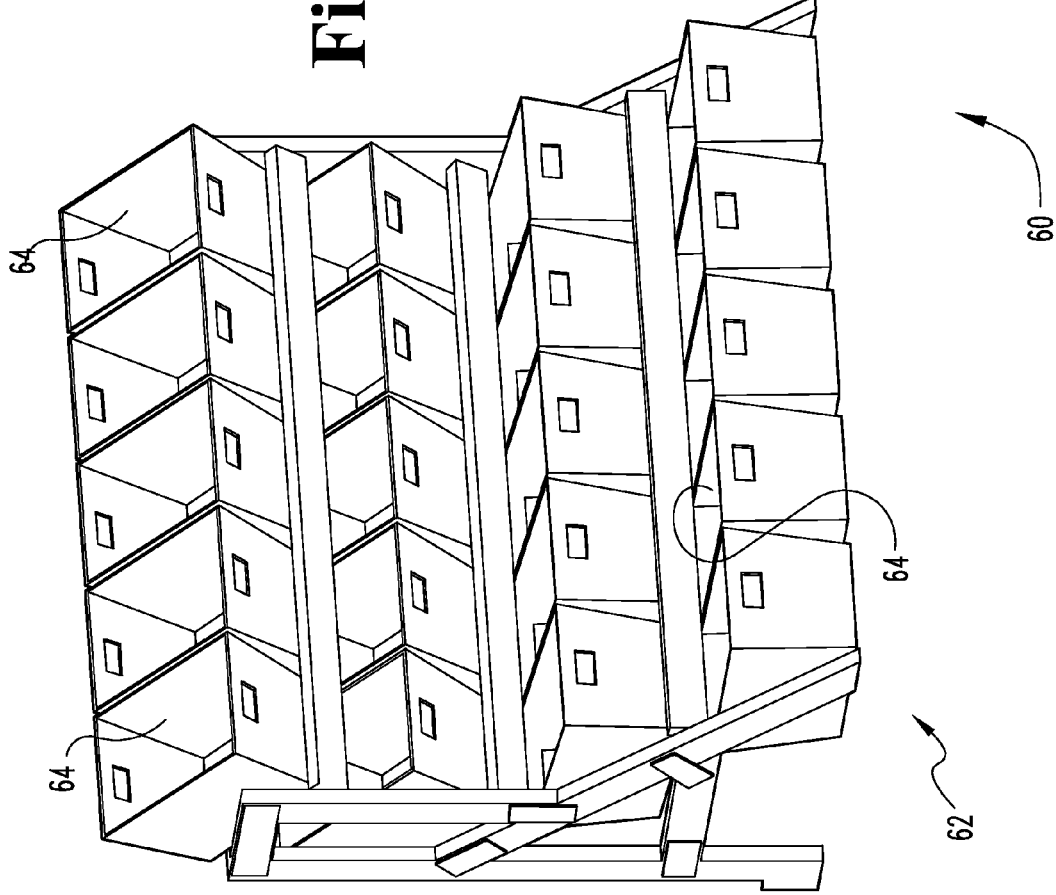
FIG. 2 illustrates one embodiment of a manual package sorting destination that could be utilized with the system illustrated in FIG. 1.

Turning now to FIG. 2, illustrated is a "territory" of bins for manual sorting. Again, in this context, "territory" refers to a grouping of destination bins, and is not related to the eventual destination of the item after sorting is completed. FIG. 2 illustrates sort territory 60. Sort territory 60 includes two bin racks 62. Each bin rack 62 holding twenty (20) destination bins 64. (Alternative embodiments of bin rack 62 may hold more or fewer bins.) Destination bins 64 being configured in four (4) rows of five (5) bins. Sort territory 60 includes two (2) bin racks 62. In one embodiment, bin racks 62 are aligned in an L-shape to facilitate ergonomic manual sorting. Utilizing two (2) bin racks 62 results in rows that are ten (10) bins across. This may allow a human sorter to readily identify the appropriate bin that individual packages to be sorted based upon a 10-digit ordering system. In one embodiment, destination bins 64 are U.S. Postal Service mail bins. In another embodiment, destination bins 64 may be wall slots. In yet another embodiment, destination bins 64 may each include a divider such that each destination bin 64 actually has two or more separate locations.

Turning back to FIG. 1, in one embodiment, each of the territory bins 52 correspond to a sort territory 60 such that a territory bin 52 can be taken to a sort territory 60 and the packages accumulated therein can be manually sorted into individual destination bins 64. In one embodiment described in greater detail below, label applicator 32 affixes a label to each package 10 that indicates the appropriate destination bin 64 each package should be sorted to by an alphanumeric code that indicates the appropriate sort territory 60 and a separate numeric code that indicates that particular destination bin in sort territory 60 a particular package 10 should be located in.

While the system described above contemplates a bin for every desired sort location, it is also contemplated that the system described above can adapt to situation where available bins are all assigned. In one embodiment, system 1 will produce a destination label that is applied to a floor area to permit additional sorting beyond available bin space. As a variant of this embodiment, a loose bin such as a standard U.S. mail bin could be labeled and located wherever it is convenient.

Figure 3:
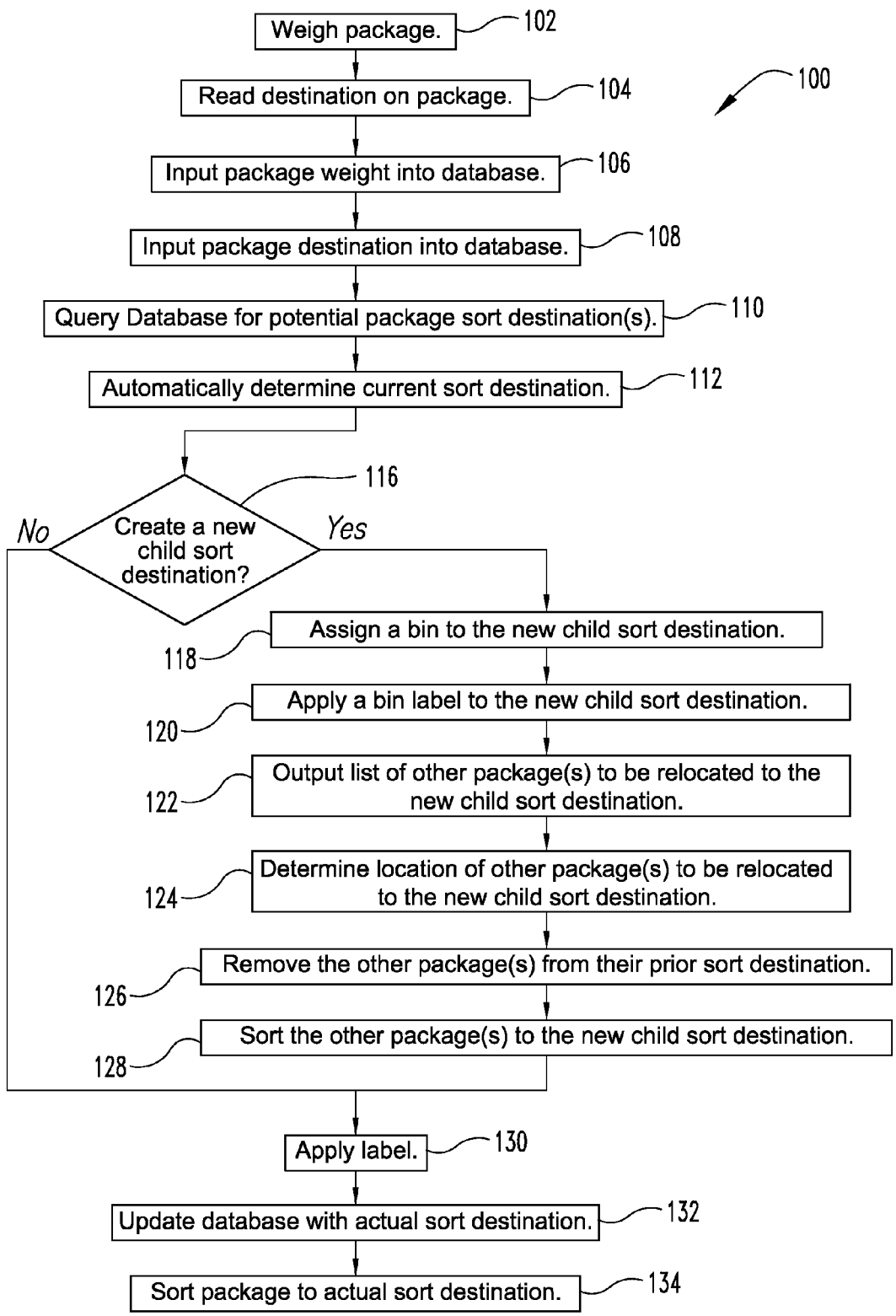
FIG. 3 illustrates one embodiment of a package sorting procedure.

Turning now to FIG. 3, procedure 100 is depicted. Procedure 100 is a procedure for sorting packages utilizing package sorting system 1. Procedure 100 begins with step 102 where package 10 is weighed on scale 22 and step 106 where the weight of package 10 is inputted into the database. In package sorting system 1, as described above, step 106 may occur automatically. In other embodiments, steps 102 and 106 may be performed by an operator using a scale and keyboard type input device to manually input the weight of package 10 into database 28. In yet other embodiments, steps 102 and 106 can be replaced by a list of package weights that are correlated by unique identifier numbers to each package. In further embodiments where the weight for all packages in a batch are the same, steps 102 and 106 may be replaced with the operator entering the weight information once for the whole batch.

Procedure 100 continues with step 104 where destination information 12 is read from package 10 and step 108 where destination information 12 is input into database 28. In one embodiment, destination information 12 is read off of package 10 using an image generated from image capture device 24 which is processed by OCR algorithm 29 resulting in machine readable destination information stored in database 28. In other embodiments destination information 12 can be read by human operator and manually keyed into database 28. In yet other embodiments, steps 104 and 108 can be replaced by a database of destinations correlated to each package 10 by a unique identifier number.

Regarding database 28, in one embodiment, database 28 includes an array correlating target location(s) with diverse destination information 12. In other embodiments, database 28 may include a hierarchy of target locations for diverse destination information 12. Such a hierarchy of target locations may also include an indication of the current target location within a particular hierarchy for one or more or all possible destinations and/or target locations.

Procedure 100 continues with step 110 where database 28 is queried by processor 27 to determine potential package target location(s). In some embodiments, this data may be stored in an array as described above. In embodiments used to process U.S. first class mail, potential package target location(s) generally include, by order of zip density: mixed mail, area distribution center, three-digit zip code breaks and five-digit zip code breaks. These potential package target location(s) correspond to destination sorts utilized by U.S. postal service to distribute mail to various post offices for delivery. Area distribution centers (ADCs) tend to serve relatively large portions of the country and included in individual area distribution centers are multiple three-digit zip code breaks. A three-digit zip code break corresponds to the first three digits in a five-digit zip code and each three-digit zip break includes all five-digit zip codes that include the same first three digits that are one three-digit zip break. In step 110, database 28 is queried to determine the ADC, three-digit and five-digit zip break applicable to destination information for an individual package 10. In step 112, processor 27 automatically determines a current target location. The current target location is the ADC, three-digit or five-digit zip break with the narrowest destination that package 10 is currently being sorted to. In embodiments practiced by service bureau centers that pre-process mail for delivery to the post office, substantially reduced postage rates can be achieved by grouping mail into appropriately sized bundles. For example, for "flats" the U.S. postal service currently allows bundles of ten (10) or more flats or trays of ninety (90) or more flats. As another example, when dealing with "letters" the U.S. postal service requires a minimum of 150 letters to a particular destination to achieve a bundled rate discount. Turning back to step 112, the implications of this when processing U.S. mail is that prior to sorting packages to a narrower destination, a sufficient number of packages to meet the minimum requirement set by the U.S. postal service must first be achieved. Turning back to the example dealing with bundled based flat processing, for example, in order to provide a bundle to a three-digit zip break, at least ten (10) flats must be destined to the same three-digit destination. So in step 112, procedure 100 determines the current destination that a particular zip code is being sorted to.

Sort destinations determined in step 112 can be allocated in several different ways. In one embodiment, arrays of predetermined destinations can be based on historic profiles for a particular customer or pool of customers. In another embodiment, high level sort destinations such as ADCs can be predetermined while other sort destinations are dynamically assigned. In yet another embodiment, all sort destinations could by dynamically assigned as needed. Referring to procedure 600 described below and in FIG. 8, it is also contemplated that sort destinations could be predetermined for particular addresses, such as a local utility, that historically have multiple units of mail sent on a daily basis.

Procedure 100 continues with step 116 where processor 27 determines whether it should create a new child target location. As described above, in embodiments processing U.S. mail, the U.S. postal service has set minimum requirements for the number of packages bundled together. Step 116 is simply a database query as to whether a minimum number of packages have been achieved to warrant creation of a more narrowly targeted destination. For example, when dealing with flats you may have a particular area distribution center destination (ADC) that includes nine (9) packages addressed to the same three-digit zip code. When a tenth piece to that same three-digit zip code is processed, processor 27 would determine that a minimum number of pieces to the particular three-digit zip code have been processed warranting the creation of a new child target location.

Once it has been determined that a new child target location is warranted in step 116, in step 118 processor 27 assigns a particular destination bin 64 to the newly created child target location. Subsequently in step 120, a bin label is applied to the newly created child target location indicating the destination for the newly assigned bin 64. In embodiments utilizing an array as described above, this would also trigger updating the array to reflect the creations or activation of the new child target location. This could include updating the current sort destination of all future packages with the same zip density as the newly created target location.

Procedure 100 continues with step 122 where processor 27 outputs a list of other packages that were previously processed and located to the destination bin 64 having the broader target destination in order to relocate them to the newly created child target location bin 64. In step 124 the location of these other packages to be relocated to the new child target location are determined and in step 126 these other packages are removed from their prior target location and in step 128 these other packages are sorted to the child target location.

Procedure 100 continues with step 130 where a label is applied to package 10 by label applicator 32. In one embodiment the label applied includes target location information that can be read by a human operator of packaging sorting system 1 to properly locate package 10 in the appropriate destination bin 64. This may include a "territory" designation as well as a bin designation.

Procedure 100 continues with step 132 where database 28 is updated with the actual target location for package 10. In embodiments utilizing an array as described above, this update may include updating the array to reflect the addition of package 10 to the target location. Procedure 100 concludes with step 134 where package 10 is sorted to the actual target location which may be the newly created child target location bin 64 or a previously designated target location bin 64, whichever is appropriate for a particular package 10.

Figures 4, 5:
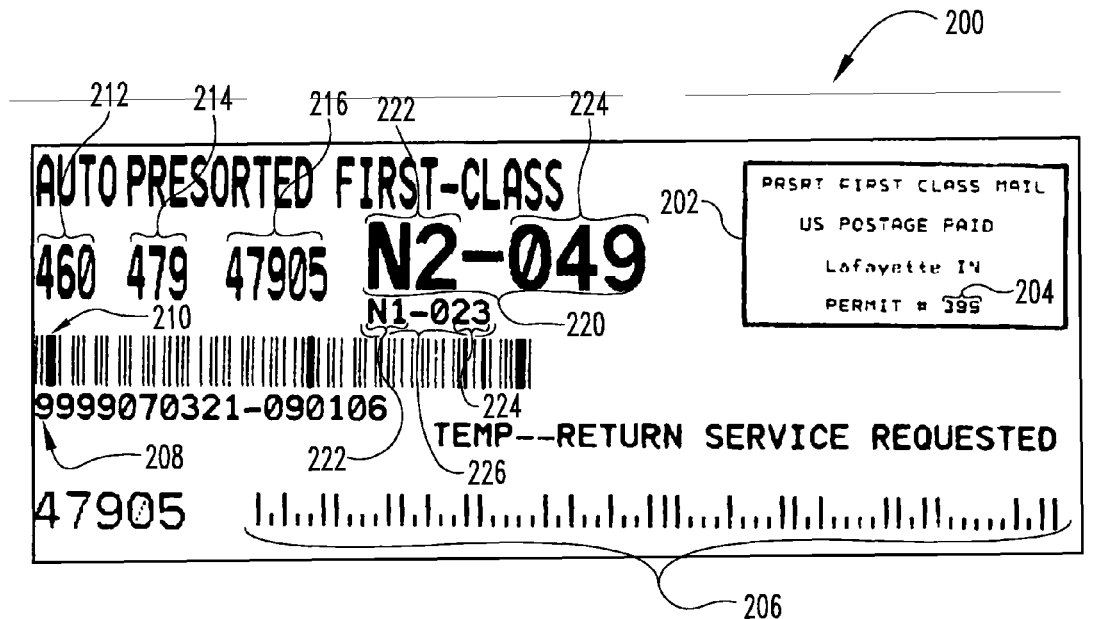
FIG. 4 illustrates one embodiment of the label that could be utilized in the system of FIG. 1 or the procedure of FIG. 3.
FIG. 5 illustrates one embodiment of a list that could be utilized in the system of FIG. 1 or the procedure of FIG. 3.

Turning now to FIG. 4, label 200 is illustrated. Label 200 includes manifest mail label 202, permit number 204, delivery point bar code 206, unique identifier 208 and 210, sort indicia 212, 214 and 216, sort code 220 including territory code 222 and bin code 224 and sweep code 226 which also includes a territory code 222 and a bin code 224.

In the illustrated embodiment of label 200, manifest mail label 202 is a manifest mailing payment label used in the U.S. postal service. Manifest mail label 202 includes permit number 204, which indicates how postage for package 10 that label 200 is applied to is paid. Also, per U.S. postal service requirements, label 200 includes delivery point bar code 206, which is an eleven-digit bar code for a particular piece of mail.

Unique identifier 208 is a numeric representation of a unique identification number and unique identifier 210 is a machine-readable bar code of the same number represented by number 208. In other embodiments, unique identifier 208 and 210 could be an alphanumeric identification code or any other unique identifier known in the art. Unique identifier 208 and 210 are associated with a particular package in database 28. In one embodiment, unique identifier 208 and 210 are used in a manifest mailing system to identify the postage paid for each piece of mail in a group mailing. Such a manifest mailing system permits the group mailing of mixed weight packages together and use of a unique identifier number allows postage to be allocated in each individual piece based on particular destination and weight information for each package 10.

Label 200 also includes indicia 212, 214 and 216 that indicate the potential target locations for a particular package. Indicia 212 represents a particular area distribution center (ADC), indicia 214 represents the three-digit zip break for a particular package and indicia 216 represents the five-digit zip code for the package.

Next to indicia 212, 214 and 216 is sort code 220. Sort code 220 includes territory code 222 and bin code 224. In reference to the embodiments illustrated in FIG. 1, territory code 222 may correspond to a particular territory bin 52 that package 10 is sorted to while with respect to the embodiment illustrated in FIG. 2, bin code 224 could correspond to a particular destination bin 64 which the package 10 is then sorted to using the method and system described above.

In the illustrated embodiment, label 200 also includes sweep code 226. Sweep code 226 also includes a territory code 222 and a bin code 224; however, for sweep code 226 this indicates the location of previously sorted packages that need to be relocated to destination bin 64 indicated by sort code 220.

Further regarding the illustrated embodiment of label 200, it should be noted that sort code 220 is presented in large and bold print. When utilizing package sorting system 1, procedure 100 may utilize some sort of highlighting on sort code 220 to indicate to the human operator that a new child target location bin has been created and that the other packages need to be relocated from their prior target location to the new child target location as described in procedure 100 with steps 124, 126 and 128. The particular form of highlighting used may be dictated by the type of label applicator 32 utilized, as some label applicators may display bolded text as inverted text with the white areas black and the black areas white. Other label applicators may utilize different text colors as a highlight.

Turning now to FIG. 5, list 300 is illustrated. List 300 includes a column for package ID 302 and machine ID 304. Reference to "package" is intended to encompass any sort item, including a post card, envelope, or larger package in the case of mailing material, or a check or credit card record in other settings, or simply items that are being sorted to different destinations regardless of whether they are wrapped at all. List 300 also includes sort number 306, job number 308 and target location table 310. List 300 may correspond to the list generated in step 122 in procedure 100. Package ID 302 is a list of the unique identifiers 208/210 found on individual packages 10. Machine 304 indicates the processing center that a particular package was processed through. This may be significant when multiple machines are used in parallel and there is the possibility for individual packages included in list 300 to be located in particular territory bin 52 rather than destination bin 64. Sort number 306 indicates the order in which the current list 300 is in comparison to other lists 300. In this regard, it is possible for an individual package to be resorted two or more times. In such cases, it is beneficial to relocate packages in the order in which resorts occur so that each package would be located in the expected location. In the illustrated embodiment, job number 308 includes a date indication followed by a numeric counter indicating the run number for the day. In other embodiments, job number 308 could identify a particular customer or group of customers.

Table 310 includes grandchild row 312, child row 314, parent row 316, grandparent row 318, sort level column 320, indicia column 322, sort code column 324 and current sort indicator 330. Sort indicator 330 is a highlighted row that indicates to the operator that they are sorting packages to a new location zip break and all the packages pulled will have the same indicia 216 corresponding to "47906" and the new location will be located at "D3-213." In the illustrated embodiment, sort indicator 330 is the top row with the color inverted. In other embodiments, sort indicator 330 (as well as the corresponding highlighted piece ID and Machine number in 302 and 304) could include bolded text, underlined text, text in a different color, offset text, or any other means to create a noticeable difference.

Rows 312, 314, 316 and 318 include all possible locations for the package, starting with grandparent row 318 up through grandchild row 312. Sort level column 320 lists an abbreviation of each of the different sort levels, with "5D" indicating a 5-digit zip break, "3D" indicating a 3-digit zip break, "ADC" indicating the ADC zip break and "MADC" inciting the mixed ADC zip break (unsorted density). Indicia column 322 lists indicia 212, 214 and 216 for each of the different sort levels. Sort code column 324 includes the sort code 220 for each of the different sort levels. The information included in table 310 may help direct an operator to the correct locations to retrieve packages for resorting.

Regarding the systems and methods described above in FIGS. 1-5, it should be understood that these figures and descriptions represent only limited embodiments of the present disclosure. While these figures have been described primarily with regard to a U.S. mail sorting application, they are equally applicable to other sorting paradigms. For example, the disclosed sorting system and method could be used by a parcel service such as UPS or Fed Ex to process parcels for distribution to various locations around the country and/or world. Events that trigger the generation of a new sort destination can be dictated by any qualification that makes economic sense to the user. For example, a new sort destination could be generated when sufficient parcels to a child destination are determined to fill a pallet, a particular shipping container or truck type. This could be driven by aggregate parcel weight, parcel size including linear dimension, footprint (area) or volume.

Figure 6:
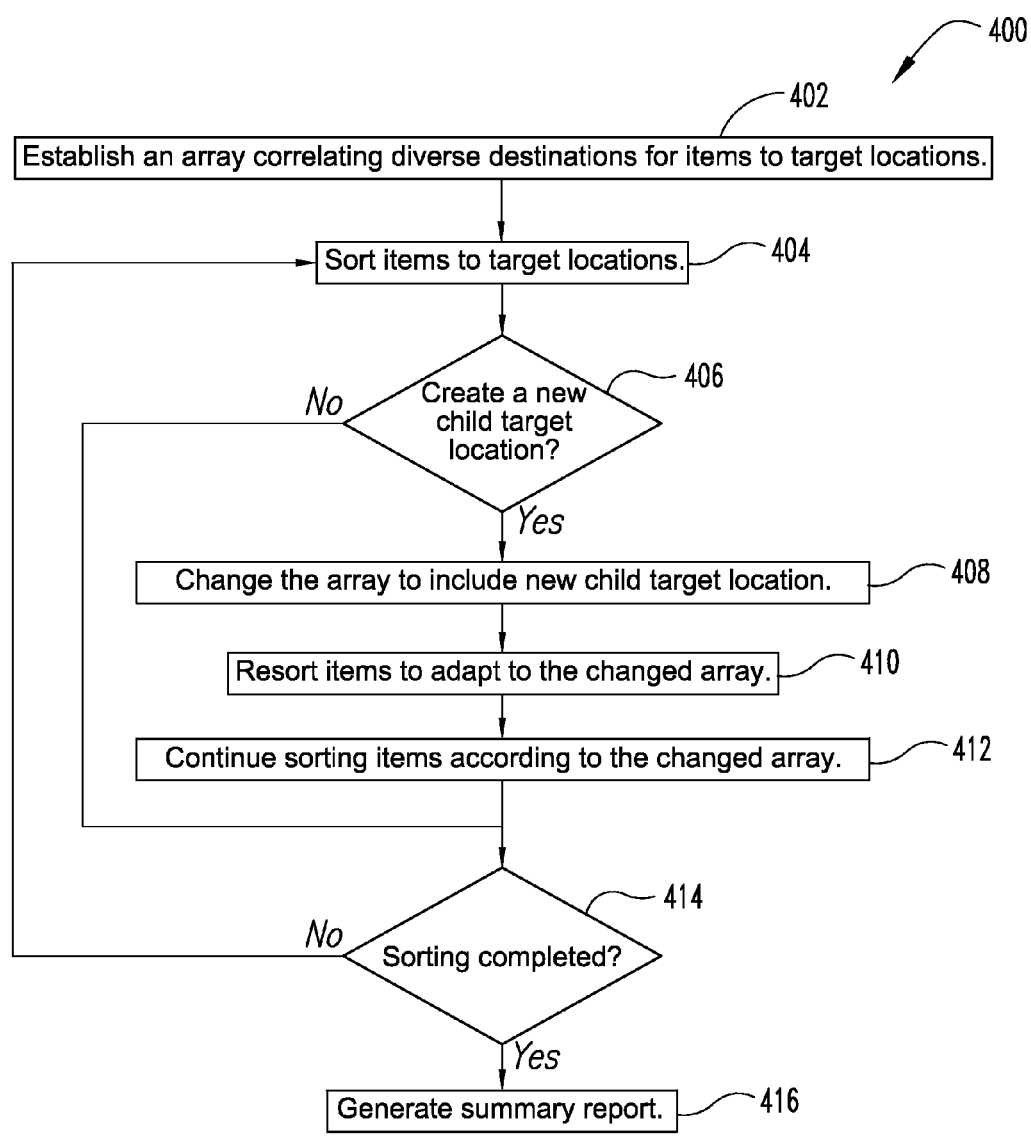
FIG. 6 illustrates one embodiment of an item sorting procedure.

Turning now to FIG. 6, an alternative embodiment of a sorting system is depicted as procedure 400. Procedure 400 begins with step 402 where an electronic array is established which correlates diverse destinations for items to target locations and step 404 where items are sorted to target locations. The electronic array referenced in step 402 could be in the form of a computerized array or any other known type of array utilizing logic circuitry. In this context, target locations refer to the location where the item is sorted to while destinations refers to an ultimate destination such as an address or a particular storage location or display location as may be utilized in other embodiments as described herein. Referring back to methods and systems described in FIGS. 1-6, target locations could be destination bin 64. In other embodiments, target locations could refer to a spot on a floor, a particular shelf location, a particular fluid repository or tank, a particular canister, a particular dock location or van or any other location in which items may be sorted.

In one embodiment, the "establishing" described in step 402 encompasses defining a predetermined array of target locations based upon anticipated density. For example, when processing U.S. mail, target location for each area distribution center could be established prior to sorting any items. Similarly, when sorting U.S. mail, generally "home territory" mail has greater density so it may be possible to set up known three-digit and five-digit zip break locations where a sufficient number of mail pieces are normally routed. In other embodiments, the step 402 establishing step occurs concurrently with the 404 sorting step such that, when beginning, no target locations are predefined and upon sorting a first item, a target location could be automatically allocated as appropriate for that first item. In this embodiment, the "first" automatic allocation would be directed to the broadest sort destination in the hierarchy of sort destinations. For example, in embodiments sorting U.S. mail, the "first" automatic allocation would be ADC destination.

Procedure 400 continues with step 406 where an evaluation of whether a new child target location should be created is performed. In the broadest sense, based upon criteria resulting from the sort performed in step 404 it is determined whether a child sort destination should be created. As described above, when dealing with U.S. mail, the U.S. postal service regulations dictate minimum bundle or flat grouping sizes. Thus, when such a grouping size is obtained, a new child target location is created and allocated. Similarly, as described above, in other embodiments, the criteria triggering the creation of a new child sort destination could include a function based upon a number of items present, aggregate weight, linear dimensions, aggregate linear dimensions, two-dimensional areas, volume, postal category, requested delivery time, thickness in trays, or height in tubs or volume in a particular container. Any of these criteria alone or in combination could establish parameters that trigger the creation of a new child target location.

If a new child target location is created, then procedure 400 continues with step 408 where the array established in step 402 is altered to include the new child target location. Procedure 400 continues with step 410 where items are resorted to adapt to the changed array. As described above for embodiments based on number of pieces to a particular target location, when the array is changed to create a new child target location there will be at least one previously sorted item that needs to be sorted to the new target location. Such an item could be located in the target location it was previously sorted to or such an item could be staged anywhere during the sorting process when allocated to the new target location. As described above, reallocation could be accomplished by printing or displaying operator instructions. In other embodiments, this could be accomplished by issuing machine instructions for an automated sorter to follow. By way of example, an automaton could sort through bins to find the identified packages using sensing technology to locate the desired items. To facilitate such an embodiment, a machine readable unique code could be included on each item. Alternatively, packages could be staged in target locations in a known order and the instructions to remove particular items could include their relative position in the location.

Procedure 400 continues with step 412 where sorting of the items continues according to the changed array. Thus, any additional items with a destination corresponding to a newly created child are directly sorted to the new child target location. Further in this regard, it is possible for a later sorted item to create another new child target location from a previously created child sort destination. For example, embodiments utilized to sort U.S. mail may have three levels of hierarchy: ADC, three-digit zip breaks and five-digit zip breaks. The initial array may have a particular piece of mail sorted to an ADC target location. After a sufficient number of additional pieces of mail have been sorted the particular piece of mail could be resorted to its three-digit target location. After a sufficient number of additional pieces of mail have been sorted the particular piece of mail could be resorted to its five-digit target location.

Procedure 400 continues with step 414 where it is determined whether sorting is complete. In embodiments that sort U.S. mail, this could occur when all the mail for a particular day has been sorted. If the sort is not complete, then procedure 400 returns to step 404 for additional sorting.

Procedure 400 concludes with a generation of a summary report in step 414 once sorting is completed. It is to be understood that step 414 is not required. However, in embodiments dealing with U.S. postal mailings utilizing manifest mail systems a generated report can be utilized to correlate any postage discount for achieving a particular zip break such as an ADC, a three- or five-digit zip break with each piece of mail. In addition, if step 404 includes weighing of each item then the summary report could correlate weight information to postage.

Referring in general to a U.S. postal presorting application, it is also possible to generate a customer billing summary that identifies a total postage for an individual customer where that total postage is a function of the postage rate discount that was actually received in manifest mail for each piece of mail from a particular customer. This could be used as an incentive for a customer to utilize a presort service bureau. The presort service bureau would receive the full U.S. postal service discounted postage rates and the service bureau could then pass along a percentage of the discount to the customer. In this way, the service bureau receives a financial incentive for presorting mail sent to the U.S. postal service and the customer receives a financial incentive to use the service bureau.

As described in FIGS. 1-5, the sorting operations that occur in steps 404 and 412 can include labeling each item with a sort routing number that corresponds to the target location for that item to permit manual sorting. Similarly, each item could be sorted using an automated sorting system to properly locate each item in its target location. Also as described above, for any items that trigger the creation of a new target location, a sort routing number for both the new and the old target location may be included on an individual label to serve as a trigger for the operator to perform the required resort described above with regard to step 410.

Figure 7:
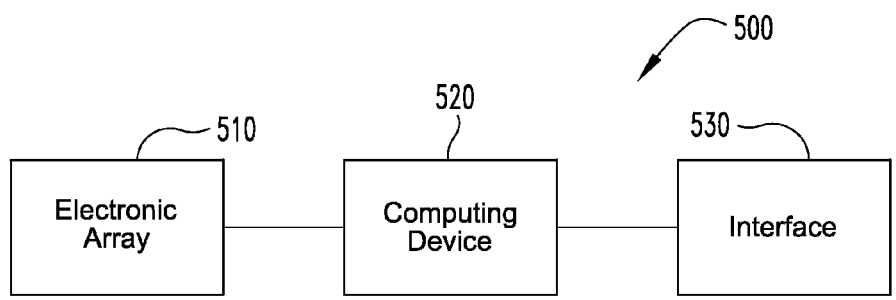
FIG. 7 illustrates an embodiment of a sorting system.

Turning now to FIG. 7, illustrated is sorting system 500, which includes electronic array 510, computing device 520 and interface 530. Electronic array 510 could include any changeable electronic array operable to correlate diverse destinations for items to target locations. Electronic array 510 could be in the form of a database stored on writable memory such as a hard drive, flash memory, Random Access Memory, or any other memory device or any other type of changeable electronic array known in the art.

Computing device 520 is an electronic processing device operable to change the content of array 510 and to monitor any applicable criteria or to determine and monitor any criteria function to determine if array 510 should be changed. Computing device 520 could be in the form of a personal computer such as a desktop or laptop model commercially available from many manufacturers. Alternatively, computing device 520 could be in the form of a programmable logic controller or a microcontroller. In one embodiment, several computing devices 520 operate in parallel from a single array 510.

Interface 530 provides communication/instructions to whatever sorting system is utilized. In an embodiment utilizing an automated presort and a manual final sort, interface 530 provides machine instructions for the automated presort and operator instructions for the manual final sort. As described above, such manual instructions could be placed directly on the item being sorted via a label, or such instructions could be provided in a separate list or display.

Regarding the embodiment(s) described above dealing with sorting U.S. mail for delivery to the U.S. Postal Service there are several additional variations of these embodiments. Many embodiments described above involve predetermined sort destinations corresponding to each national ADC and a home territory of some three and five digit zip breaks that are normally filled during sorting. However, during particular days, it is possible that one of these predefined territories does not fully meet the required criteria. In that event the mail sorted to those territories need to be consolidated in a "parent" territory. For U.S. mail, the highest parent territory for automated mail is "mixed ADC" mail, which is where any mail to an ADC that does not fully meet the required criteria is sent. In embodiments utilizing an operator for the final sorting and bundling, this can be accomplished based on the instruction(s) printed on each piece of mail. Referring to FIG. 4, indicia 212, 214 and 216 provide guidance to an operator of where a package could be sorted if the required criteria is not met. In other embodiments, separate instructions provided through printed or displayed operator instruction(s) could provide the required guidance. In embodiments utilizing automated or automaton sorting, such instructions could be in the form of machine instructions.

Other circumstances may result in predefined sort destinations not fulfilling required criteria. For example, additional resorting could be required when a resort reduces a "parent" sort destination below required criteria. For example, in an embodiment sorting flats for delivery through the U.S. Postal Service, eighteen pieces could be located in ADC "460." A nineteenth piece to ADC "460" could be the tenth piece to the three-digit zip break "479." (ADC 460 includes three-digit zip break 479.) The subsequent resort would relocate nine of the existing eighteen pieces in ADC "460" to the three-digit zip break "479," leaving only nine pieces in ADC "460." If that is how the day's sort ends, those nine pieces may need to be relocated to "mixed ADC" destination, as there would be insufficient pieces to make a bundle of flats to ADC 460 (U.S. Post Office currently requires ten piece bundles for flats).

In another embodiment, the systems described herein could optimize the total postage discount received for processing a delivery of flats. Using the example described above with regard to ADC "460" and three-digit zip break "479," in some instances using the smallest child destination does not result in the greatest postage savings. Table 1 lists the postage rate for automation one ounce flats as of 2007.

TABLE 1

| Full Postage | Mixed ADC | ADC | 3-digit | 5-digit |
|---|---|---|---|---|
| $0.80 | $0.686 | $0.567 | $0.484 | $0.383 |
| Discount: | $0.114 | $0.233 | $0.316 | $0.417 |

In the above-described situation, assuming all the pieces are one ounce flats, the total postage for sorting them as nine mixed ADC flats and ten three-digit flats is $11.014 while the total postage for sorting them as nineteen ADC flats is $10.733, a savings of $0.241. Therefore, it would be more cost effective to sort the flats as ADC flats rather than sorting ten flats to the three-digit zip break and nine flats as effectively unsorted. In this case optimization requires instructing the operator (or machine or automaton) to resort the ten flats in three-digit zip break "479" back to ADC "460." This could be accomplished through special instructions provided through printed or displayed operator instructions to an operator or machine instructions provided to an automated sorter or automaton.

Regarding other embodiments, one requirement of the U.S. Postal Service for bundle-based processing is that the "bundles" must be provided to the U.S. Post Office in standard tubs filled between 8" and 11". However, when processing flats, for example, a bundle only requires a minimum of ten pieces to be completed. For many flats, ten pieces may only be one to two inches thick. For other bundles, it is possible to exceed eleven inches thick if the flats are thick, such as some magazines, or there are a large number of units to a particular zip break. Thus, individual U.S. Post Office tubs may be filled with multiple separate bundles or a portion of an individual bundle. The U.S. Post Office also prefers that similar zip breaks be located in the same tub where possible. In order to track the location of each of the bundles provided, the U.S. Post Office requires a listing identifying the tub where each bundle is located. In some embodiments, the systems described above may also include generating a list of the created bundles. In yet other embodiments where a weight or thickness of each flat is known, processor 27 and database 28 could be programmed to estimate bundle thickness and then to allocate destinations for the estimated bundles. In such an embodiment, the generated list of bundles may also include suggested bundling instructions detailing which tub each bundle should be located in.

Figure 8:
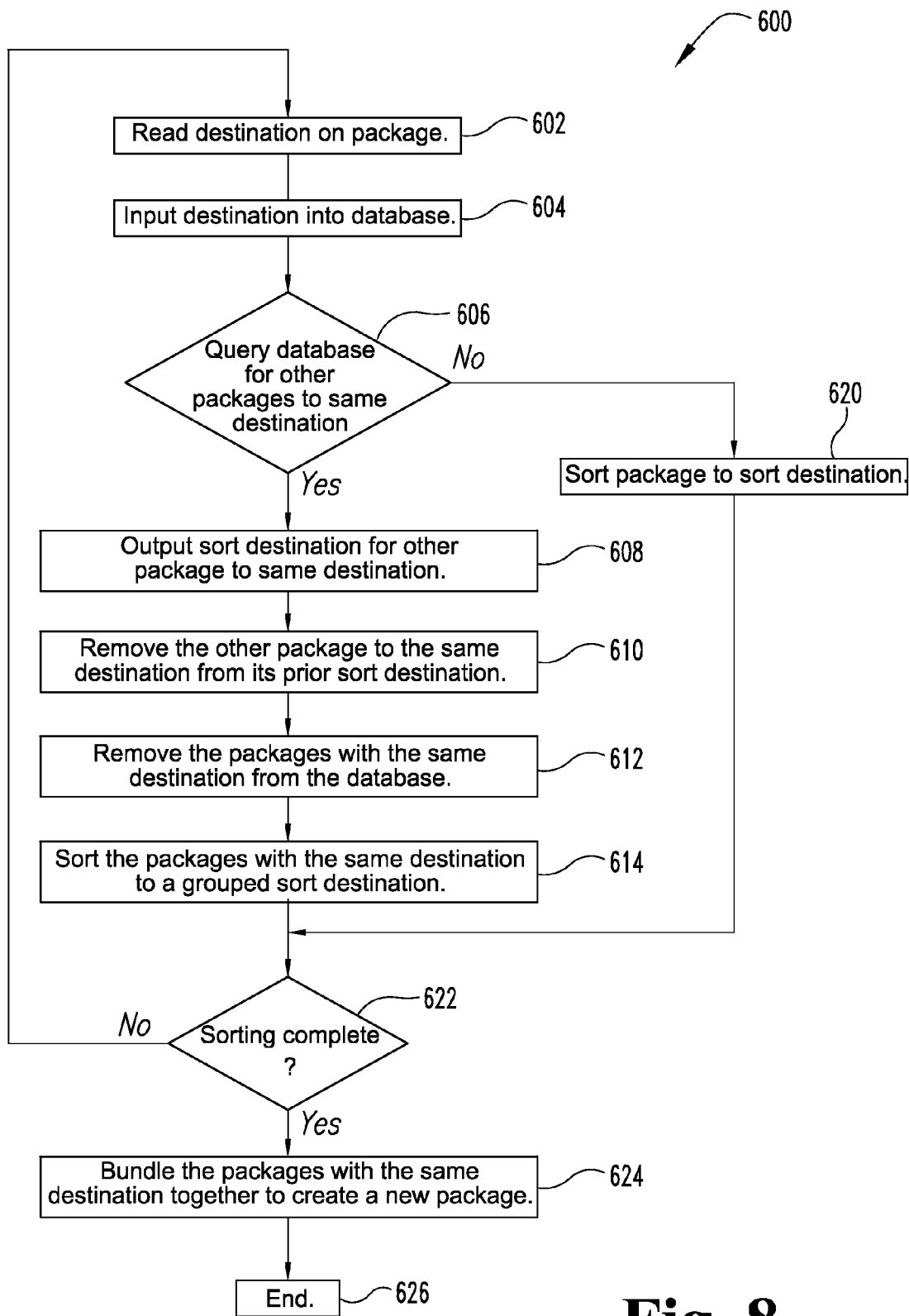
FIG. 8 illustrates an embodiment of a package sorting procedure.

Turning now to FIG. 8, procedure 600 is illustrated. Procedure 600 is a procedure for sorting packages that may be utilized with package sorting systems such as package sorting system 1 or, alternatively, the package sorting system described in the background of this document, by way of example. Procedure 600 begins with step 602 where a destination is read on a package. As described above, the destination can be read on the package using automated optical character recognition techniques or by reading automated machine readable indicia located on the package. Alternatively, the package destination may be read or determined by human operator, and associated with the specific package with an identification mark on the package, or otherwise. Next in step 604, the destination read in step 602 is inputted into a database. As described above, this may be accomplished by automated data transfer from an automated reading apparatus or the data may be manually keyed or input into a database by a human operator.

Procedure 600 continues with step 606 where the database is queried for other packages to the same destination. In embodiments sorting packages for delivery to addresses such as the U.S. mail or other parcel post shippers, in this context, the same destination indicates the same address such that packages could be consolidated and delivered as a single unit. In other embodiments, the same destination refers to the smallest possible division of destinations such that packages can be grouped and delivered to their final destination together without further subsorting required. For example, for a large company utilizing a consolidated address with subdepartments, procedure 600 may not need to be concerned with the subdepartment as consolidation to the street or post office address can be sufficient.

If in step 606 is determined that another package to the same destination exist and has already been sorted, then procedure 600 continues to step 608 where the sort destination for the other package to the same destination is outputted and step 610 where that other package to the same destination is removed from its prior sort destination and step 612 where the packages with the same destination are removed from the data base. In this context, step 612 is optionally performed in systems such as those described above where a manifest mailing may be utilized. In which case these packages going to the same destination, as will be described below, will be consolidated and repackaged together and thus will no longer be part of the mailing or sorting that was originally performed. Thus, while they were originally processed their data was inputted into the database as they have been removed that data needs to be removed from the database as well to reflect the modified sort. As step 612 is optional, some embodiments may require different actions. For example, in embodiments sorting U.S. mail where postage is applied prior to destination destiny being determined, step 612 may involve removing the pre-applied postage and crediting that postage back to the user.

Procedure 600 continues with step 614 where the packages with the same destination are sorted to a group sort destination. The group sort destination could comprise a single bin where all grouped packages are sorted. For example, in system 1 described above, packages with the same destination could all be sorted to consolidation bin 56. In other less preferred embodiments group sort destination could be assigned for each individual grouping or for select ones as an adjunct to the consolidation bin 56. As described above for different levels of zip code destinations however, care should be taken to avoid an excessive number of sort destinations. Procedure 614 then proceeds with step 622 which will be described below.

In step 606, if the database does not indicate any other packages to the same destination, then procedure 600 continues with step 620 where the package is sorted to its sort destination based on whatever sorting paradigm is utilized with procedure 600. Procedure 600 then continues with step 622.

In step 622, if the sorting is not complete, then procedure 600 returns to step 602 for further sorting. If the sorting is complete, then procedure 600 continues to step 624 where the packages with the same destinations are manually sorted into groups that are bundled together to create a new consolidated package for each destination. Step 624 could entail bundling in groups of from two to hundreds or thousands of packages addressed to the same locations together to create a single resultant consolidated bundle of packages to each destination for which multiple packages are present. When consolidated, the fee for delivery is then calculated based on the consolidated bundle, rather than upon the individual items within the bundle. In alternative embodiments, procedure 600 is applicable to packages that are electronic mail where charges or taxes are levied for such electronic mail in a manner to provide for an economic advantage to consolidation. Procedure 600 then concludes with step 626 where procedure 600 is ended.

While not specifically illustrated, it is also contemplated that the new resultant consolidated bundle of packages created in step 624 could then be sorted to sort destination using any applicable sorting technique as desired.

While the disclosure has been illustrated and described in detail in the drawings and foregoing description, the same is to be considered as illustrative and not restrictive in character, it being understood that only the preferred embodiments have been shown and described and that all changes and modifications that come within the spirit of the disclosure are desired to be protected.

What is claimed is:

1. A method of dynamically sorting items for delivery to diverse destinations in which at least one target location changes during the sorting process, the method comprising the steps of:
   (a) in a computer, establishing a first electronic array correlating diverse destinations for items to first target locations;
   (b) inputting destination information for an individual item into the computer;

(c) by the computer, electronically evaluating the array and identifying a first target location for the individual item;

(d) by the computer, electronically evaluating a criteria for the first target location and, based upon the criteria being met for the first target location, changing the electronic array by adding a second target location to the array that correlates both the individual item and a first subset of items previously correlated to the first target location to the second target location, wherein, before changing the electronic array, the second target location was not part of the array;

(e) by the computer, controlling a printer thereby producing indicia based on the changed correlation, and applying the indicia to the individual item or to a label and applying the label to the individual item, the indicia including a sort routing number and a list identifying the first subset of items sorted to the first target location;

(f) by the computer, controlling a sorter and sorting the individual item into a territory bin correlated with the second target location;

(g) reading the list and identifying the first subset of items previously sorted and removing the first subset of items previously sorted from the first target location;

(h) placing the first subset of items and the individual items in the second target location; and (i) thereafter electronically evaluating by the computer, and sorting by the sorter, further items according to the changed array where both the first and second target locations are available target locations for items evaluated after the creation of the second target location.

2. The method of claim 1, in which the electronically evaluation of the array and the criteria are concurrent.

3. The method of claim 1, in which the criteria is a function based upon a variable selected from the group consisting of number of items, weight, linear dimension, two dimensional area, volume, postal category, requested delivery time, thickness in trays or height in tubs.

4. The method of claim 1, in which the criteria is a number of items.

5. The method of claim 4, in which the number of items is ten.

6. The method of claim 1, in which the items are pieces of mail, the method further comprising the step of:

(j) by the computer, generating a manifest mailing report that identifies each piece of mail by a unique identifier and a discount postage rate, wherein the discount postage rate is a function of a zip density of each piece of mail, wherein the target locations include at least two zip densities.

7. The method of claim 6, wherein the discount postage rate is also a function of a weight of each piece of mail.

8. The method of claim 7, further comprising the step of:

(k) by the computer, generating a customer billing summary that identifies a total postage for a customer, wherein the total postage is a function of the discount postage rate for each piece of mail from the customer.

9. The method of claim 1, wherein the indicia includes a territory identifier.

10. The method of claim 1, wherein the indicia includes a bin identifier.

11. The method of claim 10, wherein the first target location has a first bin identifier and the second target location has a second bin identifier different than the first bin identifier.

12. The method of claim 1, wherein the second target location is a subset of the first target location such that items correlated with the second target location are also properly correlated with the first target location.

13. The method of claim 1, wherein the first subset of items are manually removed from the first target location.

14. The method of claim 13, wherein the first subset of items are manually placed in the second target location.

15. A method of dynamically sorting items for delivery to diverse destinations in which at least one target location changes during the sorting process, the method comprising the steps of:

(a) in a computer, establishing a first electronic array correlating diverse destinations for items to first target locations;

(b) inputting destination information for an individual item into the computer;

(c) by the computer, electronically evaluating the array and identifying a first target location for the individual item;

(d) by the computer, electronically evaluating a criteria for the first target location and, based upon the criteria being met for the first target location, changing the electronic array by adding a second target location to the array that correlates both the individual item and a first subset of items previously correlated to the first target location to the second target location, wherein, before changing the electronic array, the second target location was not part of the array;

(e) by the computer, controlling a sorter and sorting the individual item into a first territory bin correlated with the second target location;

(f) by the computer, outputting a list of the first subset of items previously sorted to the first target location, reading the list and removing the first subset of items previously sorted to the first target location from the first target location and placing the first subset of items and the individual item in the second target location; and (g) thereafter evaluating by the computer and sorting by the sorter, further items according to the changed array where both the first and second target locations are available target locations for items sorted after the creation of the second target location.

16. The method of claim 15, further comprising: (h), by the computer, controlling a printer thereby producing indicia, based on the changed correlation, and applying the indicia to the individual item or to a label and applying the label to the individual item, the indicia including a sort routing number and the list identifying the first subset of items sorted to the first target location.

17. The method of claim 16, further comprising:

(i) after applying the indicia to the individual item or applying the label to the individual item, conveying the individual item to the sorter with a conveyor.

18. The method of claim 17, in which the items are flats, the method further comprising the step of:

(j) by the computer, generating a manifest mailing report that identifies each flat by a unique identifier and a discount postage rate, wherein the discount postage rate is a function of a zip density of each flat, wherein the target locations include at least two zip densities.

19. The method of claim 15, in which the criteria is a function based upon a variable selected from the group consisting of number of items, weight, linear dimension, two dimensional area, volume, postal category, requested delivery time, thickness in trays or height in tubs.

20. The method of claim 19, in which the criteria is a number of items.

* * * * *